Oct. 10, 1950 N. HARRIS 2,525,546
AGGREGATE SPREADER
Filed Feb. 26, 1946 4 Sheets-Sheet 1
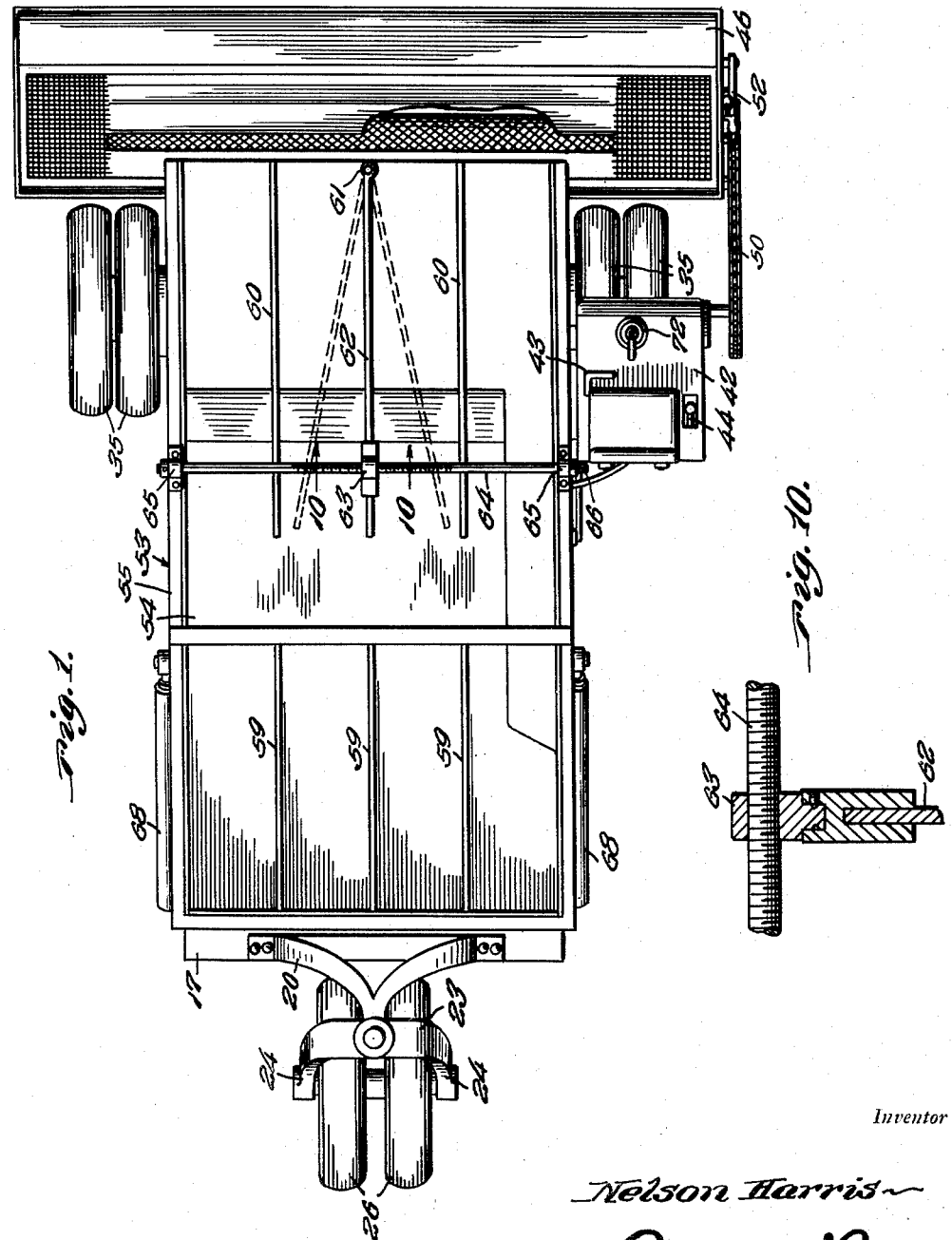
Inventor
Nelson Harris
By Clarence A. O'Brien
and Harvey B. Jacobson
Attorneys

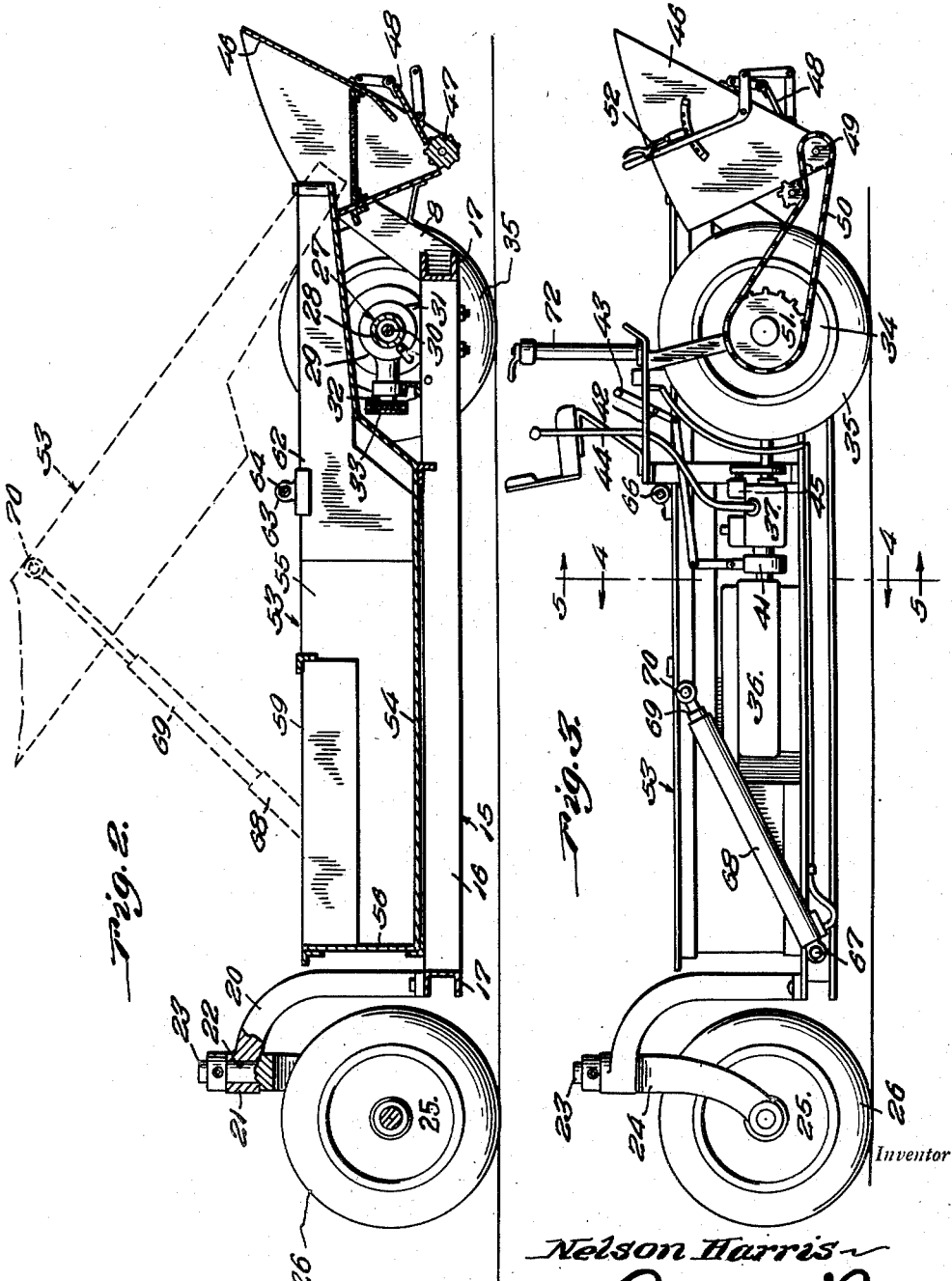

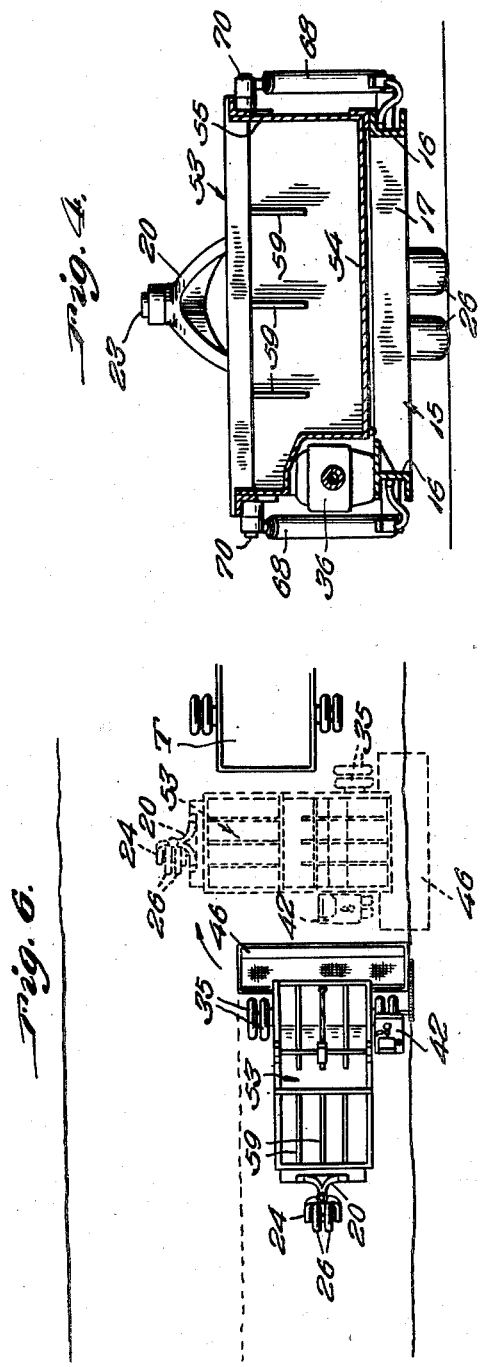

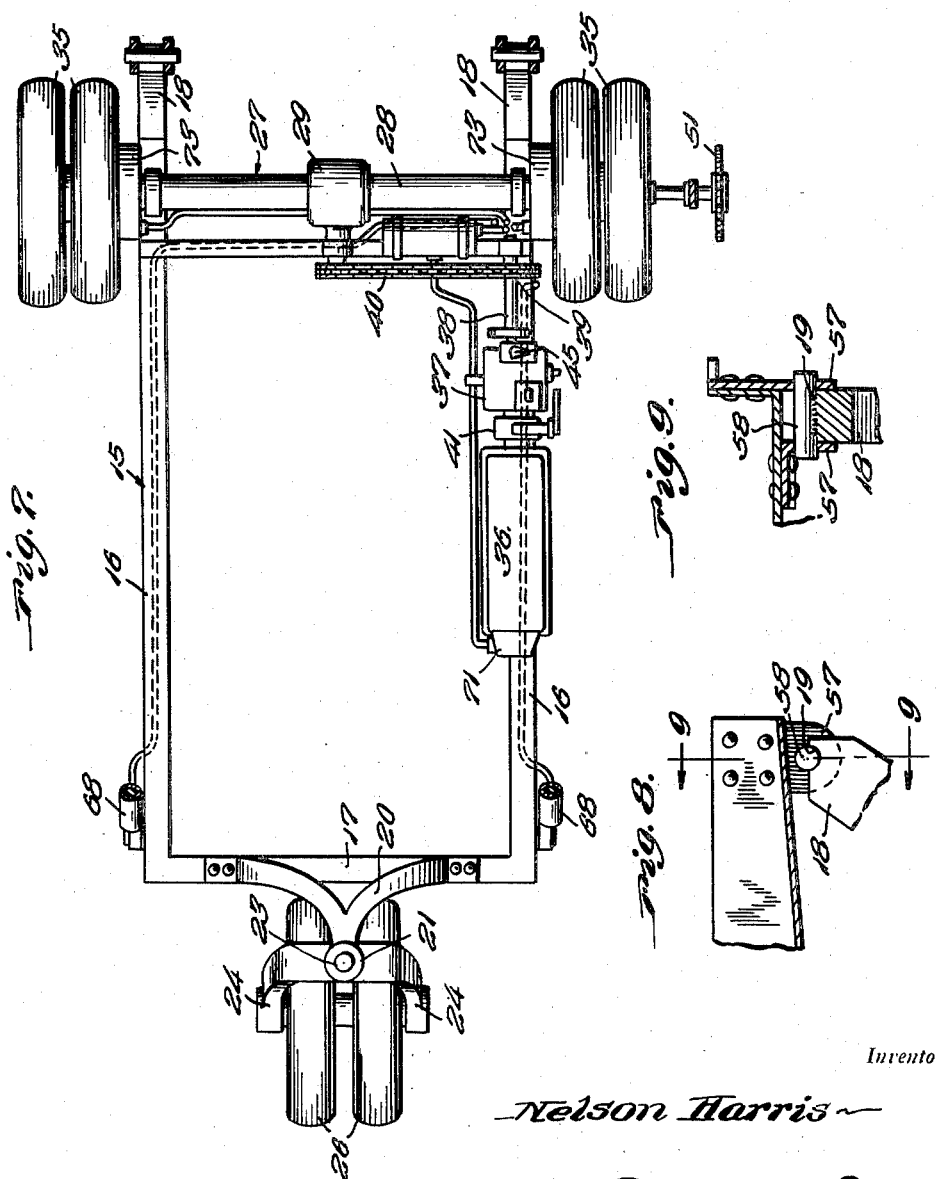

Patented Oct. 10, 1950

2,525,546

UNITED STATES PATENT OFFICE 2,525,546

AGGREGATE SPREADER

Nelson Harris, Pataskala, Ohio

Application February 26, 1946, Serial No. 650,225

2 Claims. (Cl. 275—2)

1

This invention relates to an aggregate spreader, such as is used in road building and the primary object of the invention is to insure the accurate distribution of aggregate upon a road surface.

Another object is to facilitate the continuous distribution of the aggregate without requiring periodic trips of the spreader to the source of aggregate supply, and to eliminate the necessity of providing ramps or loading platforms for use in periodically filling the spreader.

A still further object of the invention is to increase the scope of utility and the range of operation of aggregate spreaders.

Aggregate spreaders now in common use in road building are usually of the type adapted to be attached to a traction vehicle such as a truck, or road building tractor, and due to the type of the body containing the aggregate above the surface being traversed it has heretofore been necessary to build a ramp of sufficient height above the aggregate containing body of the spreader to enable a truck to be driven onto the ramp in order to discharge its contents into the body of the spreader. As a consequence the scope and range of utility of such spreaders have been seriously impaired owing to the necessity of remaining within reasonable range of the loading ramp or platform. Also due to the position of the driver of the traction vehicle it has been impossible for him to determine the exact location of the spreader with relation to the road bed with the result that irregular edges along the paved surface have been inadvertently produced so that a large amount of hand labor was required in order to compensate for these irregularities.

It is therefore a further object of this invention to enable the driver of the aggregate spreader accurately to follow the edge of the road bed in order that the aggregate may be uniformly spread on the desired area.

A still further object of the invention is to accurately gauge the quantity of aggregate deposited on a road surface in a given distance.

The above and other objects may be attained by employing this invention which embodies among its features a forward drive axle, traction wheels at opposite ends of said drive axle, a frame suspended adjacent its forward end from the drive axle, a caster wheel supporting the rear end of the frame, a prime mover on the frame connected to drive the axle, a control stand supported above and in longitudinal alignment with one traction wheel, and means operable from the control stand for transmitting power from the prime mover to the traction wheels.

2

Other features include means operable from the control stand for applying braking power to one or the other of said traction wheels in order to effect a steering control of the spreader.

Still other features include an aggregate distributing trough across the front end of the frame, an aggregate containing body pivoted to the frame adjacent the trough, and means to elevate the body in order to discharge aggregate from the body into the aggregate distributing trough.

In the drawings:

Figure 1 is a top plan view of a self-propelled aggregate distributor embodying the features of this invention, Figure 2 is a longitudinal sectional view through the aggregate distributor illustrated in Figure 1, Figure 3 is a side view in elevation of the aggregate distributor illustrated in Figure 1, Figure 4 is a transverse sectional view through the distributor taken substantially on the line 4—4 of Figure 3, Figure 5 is a view similar to Figure 4 taken on the line 5—5 of Figure 3 and looking in the direction of the arrows, Figure 6 is a diagrammatic plan view of this improved aggregate spreader illustrating in full lines the position of the spreader in use and illustrating in dotted lines the position of the spreader with relation to a dump truck ready for loading, Figure 7 is a top plan view of the spreader chassis, Figure 8 is a fragmentary enlarged sectional view illustrating the hinge connection of the spreader body with the frame or chassis, Figure 9 is a sectional view taken substantially along the line 9—9 of Figure 8, and Figure 10 is an enlarged fragmentary sectional view taken substantially along the line 10—10 of Figure 1.

Referring to the drawings in detail the spreader chassis designated generally 15 is composed of a pair of spaced parallel side bars 16 joined at their forward and rear ends by transversely extending end bars 17 to form an elongated rectangular frame structure. Extending upwardly and forwardly from the front end of the chassis 15 are brackets 18 which are provided at their upper ends with semi-circular recesses or sockets 19 the purpose of which will more fully hereinafter appear. Secured to the rear cross bar 17 of the chassis 15 is an upwardly and rearwardly arched bracket 20 carrying at its upper rear end a vertically disposed sleeve 21, in the bore 22 of which is pivotally supported the upper end of a fork 23 between the tines 24 of which is rotatably supported a caster wheel 25 provided with a conventional pneumatic tire 26. While the caster wheel 25 is described as being but one wheel it is to be understood that dual wheels may be employed as suggested in Figure 1. Extending across the upper side of the chassis 15 near the front cross-bar 17 is a drive unit 27 comprising an axle housing 28 provided intermediate its ends with a conventional differential gear housing 29 in which a differential gear train is housed in order to establish driving connection with the axle shafts 30. The housing 28 is connected adjacent opposite ends to the chassis 15 by means of suitable brackets 31 and the gear train housed within the differential housing 29 is driven by means of a drive shaft 32 carrying a drive sprocket 33 which is connected to a prime mover to be more fully hereinafter described. Opposite ends of the drive axle 30 have driving connection with drive wheels 34 equipped with conventional pneumatic tires 35. It is to be understood of course that these wheels may be of the dual type commonly employed on vehicles of this character.

Mounted on one of the side bars of the chassis 15 is a prime mover 36 which in the present instance takes the form of a conventional internal combustion engine, and connected to the drive shaft of the prime mover is a conventional transmission 37 having driving connection with a drive shaft 38 carrying a sprocket 39 over which a chain 40 is trained. This chain 40 has driving connection with the drive sprocket 33, so that the drive wheels 34 may be operated under the influence of the prime mover 36. A conventional clutch 41 is interposed between the prime mover 36 and the transmission 37. Supported on the side bar of the chassis 15 adjacent the prime mover 36 is a control stand 42 carrying a foot pedal 43 which is connected with the clutch 41 so that the clutch may be manipulated from the control stand, and a gear control lever 44 is likewise associated with the control stand for controlling the position of the gears within the transmission 37. Driven in any suitable manner from the drive shaft 38 is a tachometer 45 by means of which the speed of rotation of the drive shaft and consequently of the drive wheels 34 may be determined.

Supported on the brackets 18 and extending transversely of the chassis 15 is an aggregate distributing trough 46 comprising a substantially transversely V-shaped body open at its lower end and supporting therein a distributing roller 47 by means of which aggregate deposited in the trough may be distributed on the surface being traversed and which also serves to agitate aggregate within the trough to some extent. The trough 46 and distributing roller 47 may be of conventional form, and of the type commonly employed in apparatus of this nature. A suitable regulating gate 48 controls the feed of the aggregate from the trough 46 to the roller 47, and this roller is driven by means of a sprocket 49 over which a chain 50 having driving connection with a sprocket 51 connected to the drive axle 30 is trained. An adjusting lever 52 controls the position of the gate 48 as will be readily understood upon reference to Figure 3.

An aggregate containing body designated generally 53 and comprising a bottom 54, side walls 55 and a rear end wall 56 is provided adjacent its forward end with pairs of spaced depending ears 57 (Fig. 9) and extending transversely between said ears are pivot pins 58 which are adapted to seat in the recesses 19 (Fig. 8) in the arms 18 in order pivotally to support the body 53 at the forward end of the chassis and in a position to deliver its contents into the trough 46. Separator plates 59 extend longitudinally of the body 53 in spaced relation to the bottom 54 from the rear wall 56 for a distance equal to about one-third of the total length of the body and serve to retain the aggregate deposited therein against lateral shifting movement due to tilting of the spreader along its longitudinal axis. Similar separator plates 60 extend from a point about midway of the length of the body to its forward end and pivotally supported intermediate the plates 60 as at 61 is a similar separator or guide plate 62 which may be shifted laterally to compensate for the tilting of the aggregate spreader and insure proper distribution of the aggregate from the body 53 into the trough 46. Swivelly mounted on the upper edge of the plate 62 near its end opposite the pivot 61 is a nut 63 having threaded engagement with a transversely extending shaft 64 which is mounted for rotation in bearings 65 on the upper edges of the side walls 55 and this shaft is provided with a squared end 66 to be engaged by a suitable wrench by means of which the shaft 64 may be rotated to cause the separator 62 to swing about its pivot as suggested by the dotted lines in Figure 1. It will be understood of course that the swivelly mounted nut 63 is also arranged to move longitudinally of the upper edge of the plate 62.

Pivoted as at 67 to opposite side rails 16 adjacent their rear ends are the rear ends of a pair of hydraulic cylinders 68 containing pistons 69 the outer ends of which are pivoted as at 70 to the sides 55 of the body 53. It will thus be seen that as fluid under pressure is admitted to the cylinders 68 the pistons 69 will lift the body 53 and cause it to swing about the pivot pins 58 into the dotted line position illustrated in Figure 2 in order to discharge the contents of the body into the trough 46. The hydraulic fluid used for operating the pistons 69 is supplied through a pump 71 driven from the prime mover 36 and connected through a suitable piping system with the control column 72 mounted on the control stand 42.

In order that the direction of motion of the spreader may be controlled from the control stand I provide on each drive wheel 34 a brake drum 73 each of which contains an independently operable brake mechanism which is also controlled from the control stand 42 within convenient reach of the operator of the spreader. It will thus be seen that by manipulating one or the other brake mechanisms to cause it to engage its respective drum, the drive wheels on that side of the device may be retarded or completely stopped so as to permit the vehicle to turn in any direction according to the driving force of the opposite wheel.

In operation it will be understood that the aggregate spreader is loaded as suggested in Figure 6, that is by turning the spreader into the dotted line position therein illustrated and discharging the content of the truck T into the body 53. Having loaded the spreader it is turned into the position illustrated in the full lines in Figure 6 and due to the fact that the operator is located on the control stand 42 directly above a pair of traction wheels it is obvious that he may follow the edge of the roadway without difficulty, thus insuring the proper deposit of the aggregate on the surface. Knowing the volume of material deposited within the body 53, and being able to control the rate of discharge of the aggregate by manipulation of the lever 52 it is a simple matter for the operator to calculate the thickness of the layer of aggregate being deposited by governing his speed of movement through the medium of the tachometer 45. In this way the amount of aggregate deposited may be readily regulated so as to assure a uniform layer on the surface. Should there be a tendency of unequal distribution of the aggregate transversely of the device due to its tilting about its longitudinal axis it is but a simple matter to apply a wrench to the squared end 66 of the shaft 64 so as to adjust the dividing plate 62 to meet the conditions. Due to the fact that the aggregate spreader is self-propelled, and is under-slung so that the greatest height of its body 53 is below the bottom of the conventional dump truck it will be obvious that the spreader may be loaded without the use of ramps or loading platforms and consequently its scope of utility and range of operation is virtually unlimited so long as dump trucks servicing the spreader are accessible to it, and to a source of supply of aggregate. By reason of the control of the drive wheels 34 independently of one another it is obvious that short turns may be made and the device may be held accurately on its course.

While in the foregoing there has been shown and described the preferred embodiment of this invention it is to be understood that minor changes in the details of construction, combination and arrangement of parts may be resorted to without departing from the spirit and scope of the invention as claimed.

What I claim is:

1. A self-propelled aggregate spreader which includes a forward drive axle having a differential gear train intermediate its ends, traction wheels at opposite ends of the drive axle, a frame suspended adjacent its front end from the drive axle, a caster wheel supporting the rear end of the frame, a control stand supported in vertical and longitudinal alignment with one traction wheel, a prime mover on the frame adjacent the control stand, means operable from the control stand for transmitting power from the prime mover to the differential gear train, means operable from the control stand for selectively applying braking power to one or the other of said traction wheels, an aggregate distributing trough carried by the frame and extending transversely across the full width of the spreader in advance of the traction wheels, an aggregate distributing agitator within said trough, means coupled to one of the traction wheels for driving the agitator in unison therewith as the spreader advances, and meter means coupled with the traction wheel to indicate the speed of advance of the spreader and hence the rate at which the aggregate is being discharged as the spreader advances.

2. A self-propelled aggregate spreader which includes a forward drive axle, traction wheels at opposite ends of said drive axle, a frame suspended adjacent its forward end from the drive axle, a caster wheel supporting the rear end of the frame, a control stand supported directly above and in longitudinal alignment with one of the traction wheels, a prime mover on the frame adjacent the control stand, means operable from the control stand for transmitting power from the prime mover to the traction wheels to control the speed of advance, an aggregate distributing trough carried by the frame transversely in advance of the traction wheels and disposed so that an unobstructed view thereof may be had from the control stand, means including a distributing roller for controlling the rate of aggregate discharge from the distributing trough, means viewable from the control stand for indicating the speed of advance, whereby an operator stationed at the control stand may accurately deposit an aggregate with respect to a road bed and also by correlating the speed of advance to the rate of aggregate discharge deposit a predetermined volume of aggregate per unit and of road bed.

NELSON HARRIS.

REFERENCES CITED

The following references are of record in the file of this patent:

UNITED STATES PATENTS

| Number | Name | Date |
| --- | --- | --- |
| 1,025,646 | Roberts | May 7, 1912 |
| 1,251,176 | Braun | Dec. 25, 1917 |
| 1,261,388 | Holmes | Apr. 2, 1918 |
| 1,433,257 | Brooks | Oct. 24, 1922 |
| 1,518,294 | Allen | Dec. 9, 1924 |
| 1,584,042 | Shedenhelm | May 11, 1926 |
| 1,790,050 | Kellner | Jan. 27, 1931 |
| 2,254,104 | Joy | Aug. 26, 1941 |
| 2,280,234 | Harvey | Apr. 21, 1942 |
| 2,360,870 | Grattan | Oct. 24, 1944 |